US012762000B2

(12) United States Patent
Venkatachalam et al.

(10) Patent No.: US 12,762,000 B2
(45) Date of Patent: Oct. 13, 2026

(54) REDUCE RECURRING ISSUES AND INCIDENTS BY REMEDIATION ARTIFICIAL INTELLIGENCE

(71) Applicant: PayPal, Inc., San Jose, CA (US)

(72) Inventors: Sneha Venkatachalam, San Jose, CA (US); Jacqueline Lanxin Gao, San Jose, CA (US); Soodong Park, Fort Lee, NJ (US); Ravi Retineni, Fremont, CA (US); Maneesh Divana, Milpitas, CA (US); Yiheng Zhou, Shanghai (CN)

(73) Assignee: PayPal, Inc., San Jose, CA (US)

( * ) Notice: Subject to any disclaimer, the term of this patent is extended or adjusted under 35 U.S.C. 154(b) by 102 days.

(21) Appl. No.: 18/515,854

(22) Filed: Nov. 21, 2023

(65) Prior Publication Data

US 2025/0165330 A1 May 22, 2025

(51) Int. Cl.
*G06F 11/07* (2006.01)

(52) U.S. Cl.
CPC ........ *G06F 11/079* (2013.01); *G06F 11/0721* (2013.01)

(58) Field of Classification Search
CPC ........................... G06F 11/079; G06F 11/0721
See application file for complete search history.

(56) References Cited

U.S. PATENT DOCUMENTS

2019/0158309 A1* 5/2019 Park .................... H04L 12/2812
2019/0277913 A1* 9/2019 Honda ............... G01R 31/2894
2022/0244938 A1* 8/2022 Alamir ................... G06N 5/022
2022/0400942 A1* 12/2022 Leung .................. A61B 3/0025
2023/0325748 A1* 10/2023 Duma ................. G06F 11/0775
705/7.28
2025/0077778 A1* 3/2025 Zhang ..................... G06F 16/38

OTHER PUBLICATIONS

Wikipedia ensemble learning 08222023 (Year: 2023).*

* cited by examiner

*Primary Examiner* — Bryce P Bonzo
*Assistant Examiner* — Xinyuan Yu
(74) *Attorney, Agent, or Firm* — Haynes and Boone, LLP

(57) ABSTRACT

Systems, methods, and computer program products for using artificial intelligence (AI) models, machine learning, and large language models to identify root causes of issues in a computing environment where multiple applications and computing devices operate. One or more AI models may determine adverse trends from one or more issue metrics, where an issue metric corresponds to issues occurring in a computing system. The AI models may identify issues corresponding to the adverse trends. From the identified issues, the AI models may determine root causes from the issues and the impacted area information and process information from the issues. From the issues and the impacted area information and process information from the issues the AI models may determine recommendations for rectifying the issues. The relations between the root causes, the impacted area information, the process information, and the issues may be formatted and displayed as a traversable network graph.

20 Claims, 13 Drawing Sheets

400A

400B

600A

600B

600C

800

Example - Recommending remediation actions for issues using Gen AI
Identify remediation actions for a scenario where a risk model fails to detect and flag high-risk accounts Here are 5 potential remediation actions for the risk model not detecting high-risk accounts:

- Review model logic and thresholds to identify gaps in detecting high risk behaviors. Adjust as needed to improve detection.
- Expand data inputs to the model to incorporate additional risk indicators that could enhance accuracy.
- Retrain the model regularly using new data with required risk account labels to improve identification of emerging risks.
- Implement periodic back testing to measure model performance vs actual high-risk outcomes. Update model based on results.
- Establish human-in-the-loop reviews of a sample of model outcomes to identify potential gaps. Feed back into model refinement.

FIG. 8

REDUCE RECURRING ISSUES AND INCIDENTS BY REMEDIATION ARTIFICIAL INTELLIGENCE

TECHNICAL FIELD

The disclosure generally relates to issue remediation in a computing system, and more specifically using machine learning to detect and identify issues in the computing system.

BACKGROUND

In a computing system there may be more than a thousand issues that occurs each year, with over hundred thousand incidents that are tied to these issues. In fact, there may be over one hundred issues and ten thousand incidents that occur in the computing system each month. These issues may impact the company's revenue and customer satisfaction. Nevertheless, in a computing system that involves hundreds of computers and applications it may be difficult to identify and correct the root cause of these issues.

BRIEF DESCRIPTION OF THE DRAWINGS

FIG. 8 is a diagram of a root cause detection system interface depicting an AI model generated recommendations, according to some embodiments.

Figure 1:
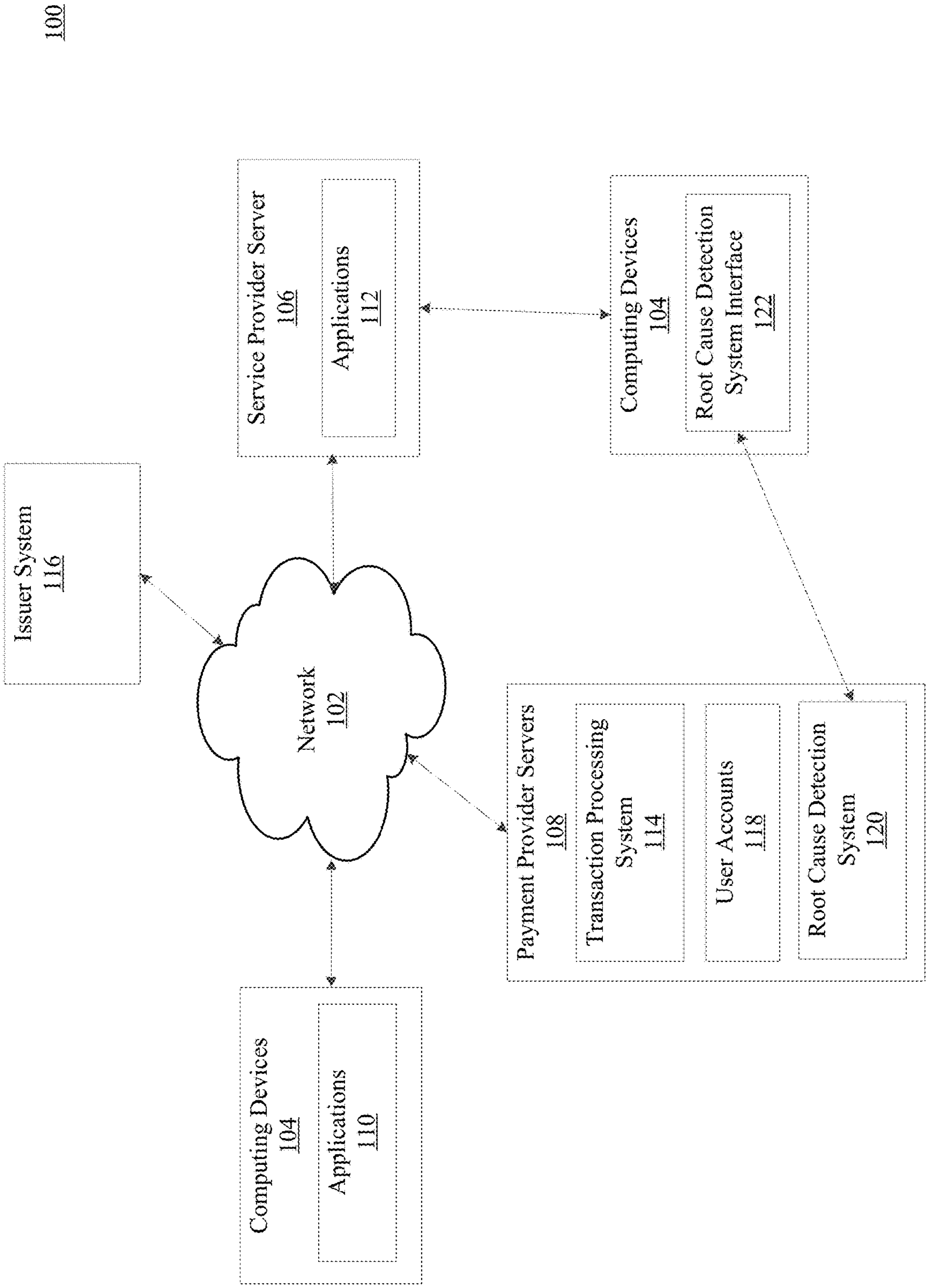
FIG. 1 is an exemplary system where a root cause detection system can be implemented.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The embodiments are directed to a root cause detection system. The root cause detection system includes a trend analytics module, a root cause identification module, and a recommendation module that uses machine learning, neural networks, and large language models to determine root causes of issues that occur in a computing system and generate recommendations for solving the issues.

In some embodiments, the trend analytics module may perform an automated root cause analysis that detects factors contributing to issues in a computing environment. As part of the analysis, trend analytics module may include one or more artificial intelligence (AI) models. One of AI models may receive an issue metric that identifies outstanding issues, historical issues, an average time to resolve issues, and the like. The AI model may detect adverse trends from the issue metric. An example adverse trend may be an increase in the outstanding issue volume or a rise in the past due issues that were reported over a predefined time interval. The same or different AI model may receive the adverse trends and generate a narrative or a summary that summarizes the adverse trends.

In some embodiments, the same or different AI model in the trend analytics module may receive the adverse trends and identify issues, such as adverse issues, in the computing environment. To identify issues, the AI model may analyze the identified trends according to multiple configurable dimensions, such as issue priority, risk, compliance or customer impact classification.

The root cause identification module may also identify a top root cause or a configurable number of top root causes that contribute to the issues. Root cause identification module may include an ensemble of AI models that may operate in sequence or in parallel. One of the AI models in the ensemble may identify similar issues to the issues identified by the trend analytics module. Another AI model in the ensemble may identify root cause information associated with the issues identified by the trend analytics module. Yet another AI model may receive the similar issues and the root cause information and determine one or more root causes for the issues.

The root cause identification module may also include AI models that identify impacts to the computing environment associated with the issues. For example, one AI model may identify areas impacted by the issues, which may include impacted systems, products, applications, organizations, and the like. Another AI model may identify processes or functions impacted by the issues. In some embodiments, a single AI model may identify both impacted areas, processes, and functions.

The recommendation module may include one or more AI models that provide recommendations for rectifying the issues. One AI model may receive the root causes and generate historical issues that correspond to similar root causes. Another AI model may receive the impacted areas, processes, and functions and the historical issues and generate recommendations for remedying the issues in the computing system.

Notably, the use of the AI models is not limited to the above embodiments, as the root cause detection module may include a single AI model or a combination of AI models executing in sequence or in parallel to perform the above tasks.

In some embodiments, a computing device may display a graphical user interface that displays a network graph. The network graph may show a relationship between root causes, the impacted areas, impacted functions and/or processes, and issues associated with the impacted areas. The network graph may be traversed when the user interface receives an input that selects one of the root causes. From the selected root cause, the network graph may identify the impact areas and the issues. In some instances, the graphical user interface may also display a summary summarizing the adverse trends, as well as recommendations for rectifying the issues.

The root cause detection system provides numerous benefits to a computing environment. First, it identifies issues and root causes that degrade performance of the computing environment, including low performance, reduced bandwidth, reduced application processing and the like. The issues and root causes of the issues are particularly difficult to identify when the root causes affect numerous computing devices and may manifest in different forms in different unrelated applications. Identifying and fixing the issues and root causes improves the overall performance of the computing environment, including improvements to the system bandwidth, processing time, and system utilization. Second, the root cause detection system uses artificial intelligence models trained and finetuned on root causes and issues to provide recommendations for resolving the identified root causes and impacted applications and processes in the computing environment. This way issues can be remedied consistently across the computing environment, and not treated as isolated incidents across different applications with inconsistent solutions. Third, the structure and the combination of multiple artificial intelligence models allows the root cause detection system to determine the root causes and impacted areas of the root causes in parallel, thus increasing throughput and efficiency of the root cause detection system.

Further embodiments of the root cause detection system are discussed below.

FIG. 1 is an exemplary system 100 where embodiments can be implemented. System 100 may be a computing environment or a computing system. System 100 includes a network 102. Network 102 may be implemented as a single network or a combination of multiple networks. For example, in various embodiments, network 102 may include the Internet or one or more intranets, landline networks, wireless networks, and/or other appropriate types of networks. Network 102 may be a small-scale communication network, such as a private or local area network, or a larger scale network, such as a wide area network.

Various components that are accessible to network 102 may be computing device(s) 104, service provider server(s) 106, and payment provider server(s) 108. Computing devices 104 may be portable and non-portable electronic devices under the control of a user and configured to transmit, receive, and manipulate data from service provider server(s) 106 and payment provider server(s) 108 over network 102. Example computing devices 104 include desktop computers, laptop computers, tablets, smartphones, wearable computing devices, eyeglasses that incorporate computing devices, implantable computing devices, etc.

Computing devices 104 may include one or more applications 110. Applications 110 may be pre-installed on the computing devices 104, installed on the computing devices 104 using portable memory storage devices, such as compact disks or thumb-drives, or be downloaded to the computing devices 104 from service provider server(s) 106 and/or payment provider server(s) 108. Applications 110 may execute on computing devices 104 and receive instructions and data from a user, from service provider server(s) 106, and payment provider server(s) 108.

Example applications 110 may be payment transaction applications. Payment transaction applications may be configured to transfer money world-wide, receive payments for goods and services, manage money spending, etc. Further, applications 110 may be under an ownership or control of a payment service provider, such as PAYPAL®, Inc. of San Jose, CA, USA, a telephonic service provider, a social networking service provider, and/or other service providers. Applications 110 may also be analytics applications. Analytics applications perform business logic, provide services, and measure and improve performance of services and functions of other applications that execute on computing devices 104 based on current and historical data. Applications 110 may also be security applications for implementing client-side security features, programmatic client applications for interfacing with appropriate application programming interfaces (APIs) over network 102, communication applications, such as email, texting, voice, and instant messaging applications that allow a user to send and receive emails, calls, texts, and other notifications through network 102, and the like. Applications 110 may be location detection applications, such as a mapping, compass, and/or global positioning system (GPS) applications, social networking applications and/or merchant applications. Additionally, applications 110 may be service applications that permit a user of computing device 104 to receive, request and/or view information for products and/or services, and also permit the user to purchase the selected products and/or services.

In an embodiment, applications 110 may utilize numerous components included in computing device 104 to receive input, store and display data, and communicate with network 102. Example components are discussed in detail in FIG. 4.

As discussed above, one or more service provider servers 106 may be connected to network 102. Service provider server 106 may also be maintained by a service provider, such as PAYPAL®, a telephonic service provider, social networking service, and/or other service providers. Service provider server 106 may be software that executes on a computing device configured for large scale processing and that provides functionality to other computer programs, such as applications 110 and applications 112 discussed below.

In an embodiment, service provider server 106 may initiate and direct execution of applications 112. Applications 112 may be counterparts to applications 110 executing on computing devices 104 and may process transactions at the requests of applications 110. For example, applications 112 may be financial services applications configured to transfer money world-wide, receive payments for goods and services, manage money spending, etc., that receive message from the financial services applications executing on computing device 104. Applications 112 may be security applications configured to implement client-side security features or programmatic client applications for interfacing with appropriate application programming interfaces (APIs) over network 102. Applications 112 may be communication applications that perform email, texting, voice, and instant messaging functions that allow a user to send and receive emails, calls, texts, and other notifications over network 102. In yet another embodiment, applications 112 may be location detection applications, such as a mapping, compass, and/or GPS applications. In yet another embodiment, applications 112 may also be incorporated into social networking applications and/or merchant applications.

In an embodiment, applications 110 and applications 112 may process transactions on behalf of a user. In some embodiments, to process transactions, applications 110, 112 may request payments for processing the transactions via payment provider server(s) 108. For instance, payment provider server 108 may be a software application that is configured to receive requests from applications 110, 112 that cause the payment provider server 108 to transfer funds of a user using application 110 to service provider associated with application 112. Thus, applications 110 and 112 may receive user data, including user authentication data, for processing any number of electronic transactions, such as through payment provider server 108.

In an embodiment, payment provider servers 108 may be maintained by a payment provider, such as PAYPAL®. Other payment provider servers 108 may be maintained by or include a merchant, financial services provider, credit card provider, bank, and/or other payment provider, which may provide user account services and/or payment services to a user. Although payment provider servers 108 are described as separate from service provider server 106, it is understood that one or more of payment provider servers 108 may include services offered by service provider server 106 and vice versa.

Each payment provider server 108 may include a transaction processing system 114. Transaction processing system 114 may correspond to processes, procedures, and/or applications executable by a hardware processor. In an embodiment, transaction processing system 114 may be configured to receive information from one or more applications 110 executing on computing devices 104 and/or applications 112 executing on service provider server 106 for processing and completion of financial transactions. Financial transactions may include financial information corresponding to user debit/credit card information, checking account information, a user account (e.g., payment account with a payment provider server 108), or other payment information. Transaction processing system 114 may complete the financial transaction for the purchase request by providing payment to application 112 executing on service provider server 106. For example, transaction processing system 114 may communicate with one or more issuer systems 116, such as credit card, debit card, and/or bank systems, to provide payment for the transaction to application 112 executing on service provider server 106.

Payment provider server 108 may also include user accounts 118. Each user account 118 may be established by one or more users using applications 110 with payment provider server 108 to facilitate payment for goods and/or services offered by applications 112. User accounts 118 may include user information, such as name, address, birthdate, payment/funding information, travel information, additional user financial information, and/or other desired user data. In a further embodiment, user accounts 118 may be stored in a database or another memory storage described in detail in FIG. 10.

Payment provider servers 108 may also include a root cause detection system 120. Root cause detection system 120 may include one or more artificial intelligence models, machine learning models, one or more neural networks, large language models, or a combination thereof that may operate in sequence or in parallel to identify issues that may occur in system 100, the adverse trends that are caused by the issues, the root causes of the issues, and proposed recommendations for rectifying the issues. For example, root cause detection system 120 may identify the adverse trends and issues that may occur in network 102, payment provider server 108, service provider server 106, applications 110, 112, transaction processing system 114, and other applications, systems, and the like. The root cause detection system 120 may also identify the root causes associated with the issues, as well as generate recommendations for rectifying the issues.

Root cause detection system 120 may also be communicatively connected to a root cause detection system interface 122. Root cause detection system interface 122 may operate on one of computing devices 104 in system 100 and may be accessible to payment provider servers 108 and/or service provider servers 106. Root cause detection system interface 122 may display a summary summarizing adverse trends and recommendations. Root cause detection system interface 122 may also display a traversable network graph that connects the root causes, the issues, and the applications, entities, processes, and/or functions that may be experiences the issues.

Figure 2:
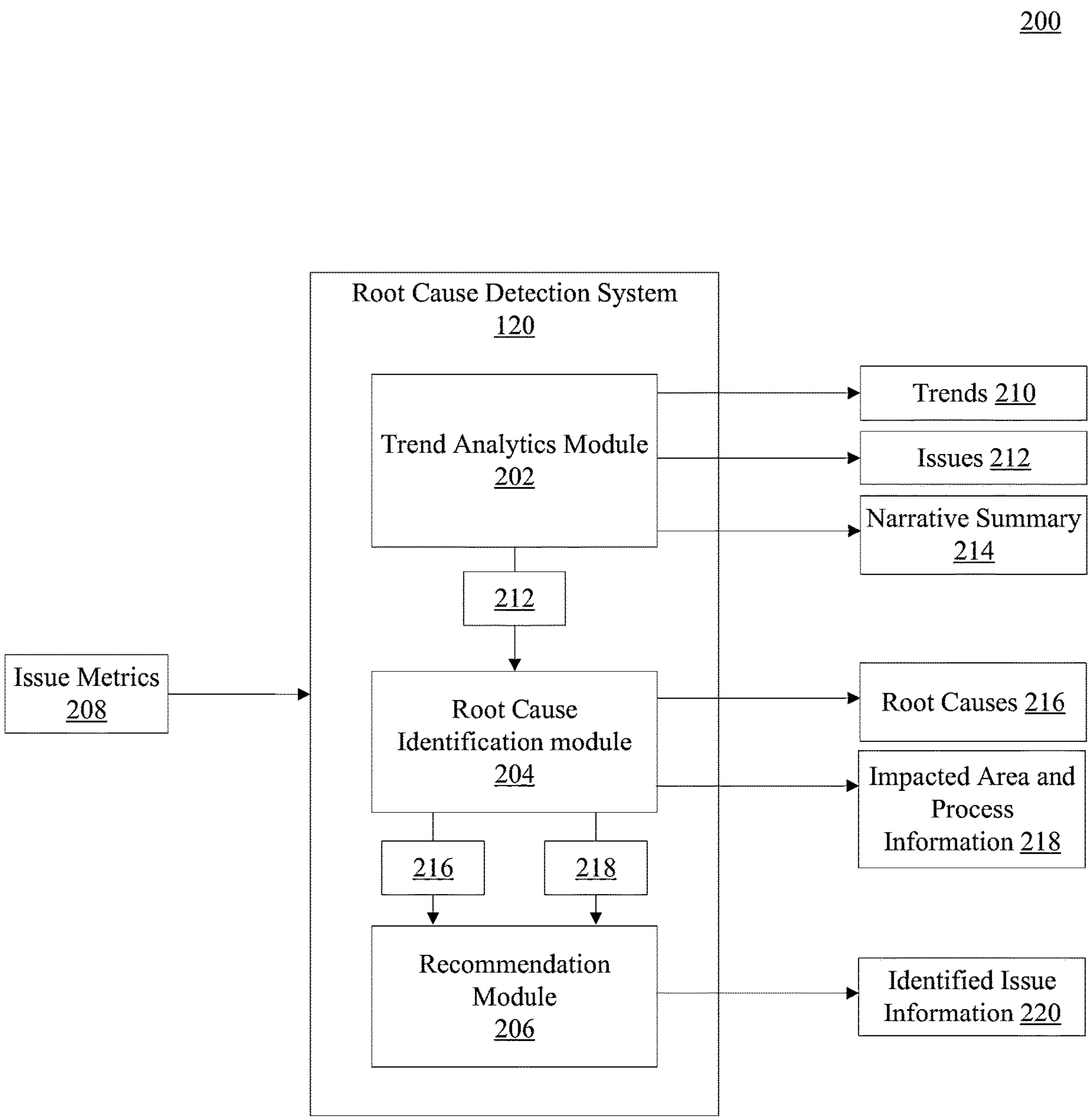
FIG. 2 is a block diagram of a root cause detection system, according to some embodiments.

FIG. 2 is a block diagram 200 of a root cause detection system 120, according to some embodiments. Root cause detection system 120 may be implemented in hardware or software or a combination thereof. Root cause detection system 120 may include a trend analytics module 202, a root cause identification module 204, and a recommendation module 206. Root cause detection system 120 may receive issue metrics 208. Issue metrics 208 may include one or more metrics storing data associated with issues in system 100. The issue metrics 208 may be compiled based on the issues that occur in various applications, servers, systems, etc., in system 100 over a predetermined time period. An example issue metric in issues metrics 208 may include an outstanding issues metric, an outstanding issue volume metric, a past due issues metric, an average time to resolve issues metric, and the like.

Figure 3:
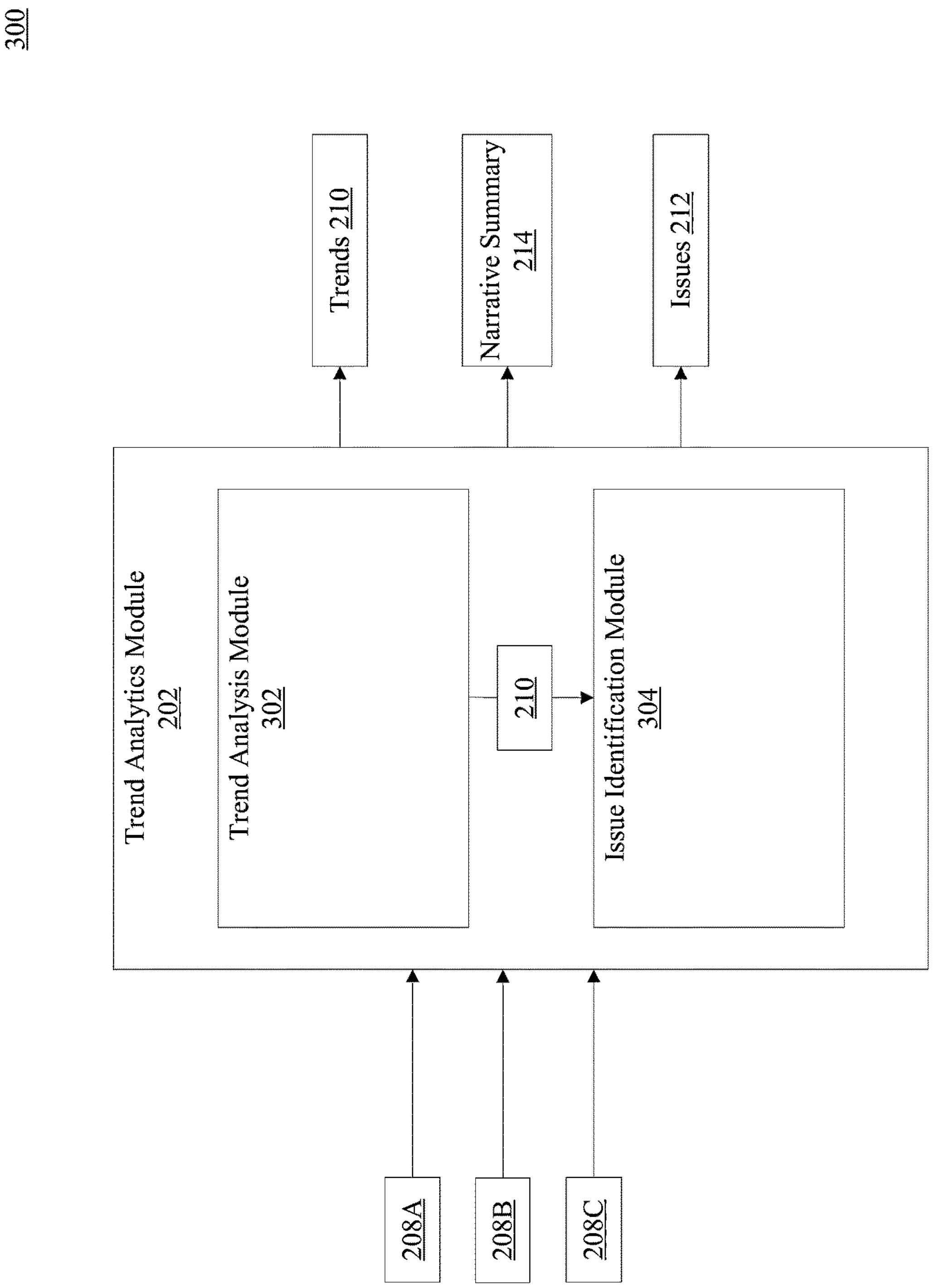
FIG. 3 is a block diagram of a trend analytics module, according to some embodiments.

Trend analytics module 202 may receive issue metrics 208 and automatically detect adverse trends 210 and issues 212 that contribute to the adverse trends 210. The issues 212 can be ongoing issues, breakdown of issue trends in computing environment 100, and correlative issue trends of the adverse trend. Additionally, trend analytics module 202 may generate a narrative summary 214 of the adverse trends 210 and/or issues 212. FIG. 3 is a block diagram 300 of trend analytics module 202, according to some embodiments. Trend analytics module 202 may include a trend analysis module 302 and an issue identification module 304. In an exemplary embodiment in FIG. 3, trend analytics module 202 may receive issue metrics 208A-C.

Trend analysis module 302 may include one or more of AI models, which may be a generative artificial intelligence (AI) model, a large language model (LLM), such as GPT-4 or its variants, or the like. Trend analysis module 302 may receive issue metrics 208A-C and automatically detect adverse trends 210 from issue metrics 208A-C. An example adverse trend 210 may be a trend that corresponds to an unusual behavior, such as an increase in outstanding issue volume over a short time interval (e.g., the short time interval may be predefined, be a hyperparameter, be an input to trend analysis module 302, or trend analysis module 302 may be finetuned to recognize a predefined time interval). Another example adverse trend 210 may be an increase in the number of past due issues reported.

In some embodiments, trend analysis module 302 may use adverse trends 210 to generate a narrative summary 214 that summarizes the adverse trends 210.

The one or more AI models in trend analysis module 302 may be trained or finetuned to identify adverse trends 210 using a training dataset. The training dataset may include issue metrics and trend labels, and the one or more AI models may be trained until the one or more AI models may predict the trends from the issue metrics with an accuracy above a predefined threshold. During training, the parameters and/or activation functions within the one or more AI models may be changed based on a difference between the actual AI model output and the expected AI model output.

Issue identification module 304 may receive the adverse trends 210. In some instances, issue identification module 304 may also include one or more AI models, such as a generative AI model, an LLM, such as GPT-4 or its variants in some examples. Issue identification module 304 may analyze the adverse trends 210 based on a variety of dimensions to identify issues that cause the adverse trends 210. Example dimensions may include the issue priority, risk category, compliance or customer impact classification, etc. Issue identification module 304 may also identify the attributes in the adverse trends 210 that correlated to increase or decrease in the adverse trends 210. Based on the identified attributes, issue identification module 304 may identify issues 212 that contributed in to the adverse trends 210. In some instances, issues identification module 304 may also generate a narrative summary that summarizes identified issues 212. The narrative summary may be included in narrative summary 214.

Figure 4A:
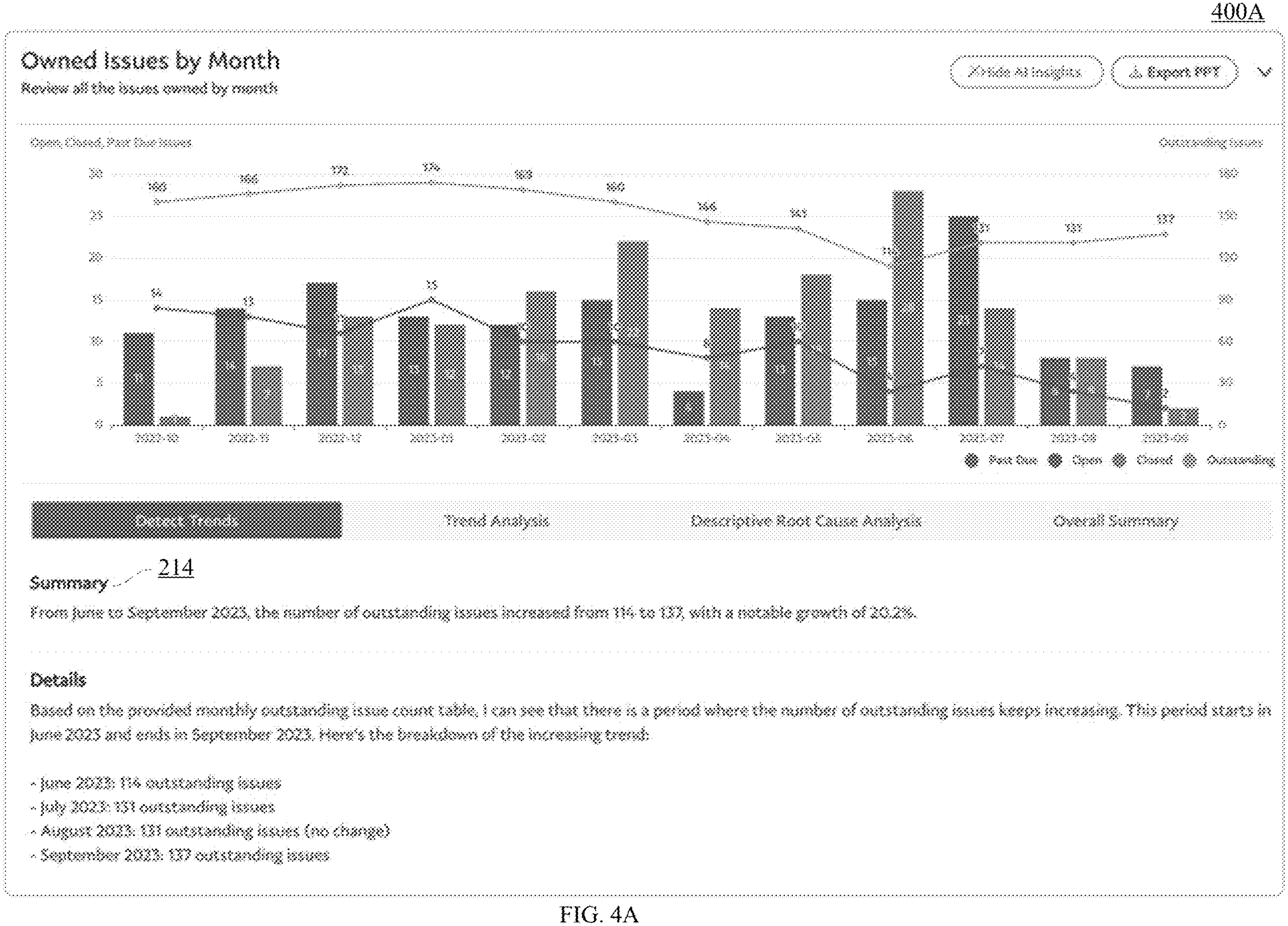
FIGS. 4A-B are diagrams of a root cause detection system interface depicting trend summaries, according to some embodiments.
Figure 4B:
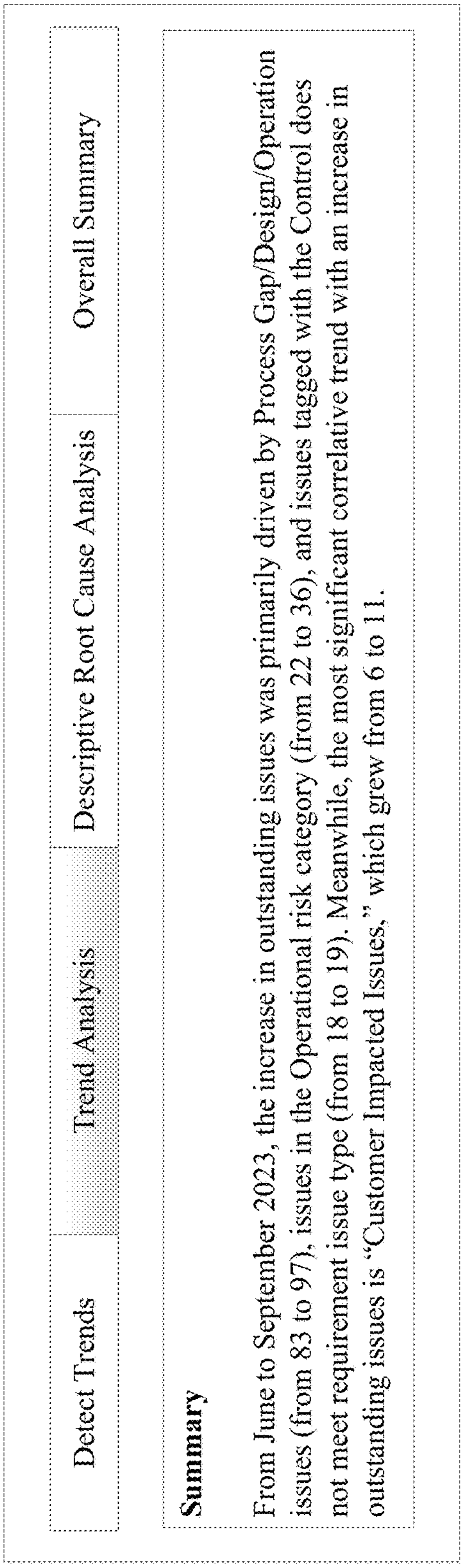

In some embodiments, trend analytics module 202 may display the adverse trends 210, identified issues 212, and narrative summaries 214 using root cause detection system interface 122. FIG. 4A is a diagram 400A of root cause detection system interface 122 displaying the adverse trends 210, identified issues 212, and narrative summary 214 of the adverse trends 210, according to some embodiments. FIG. 4B is a diagram 400B illustrating adverse trends that may exist in computing environment 100 over a specified time period, according to some embodiments.

Figure 5:
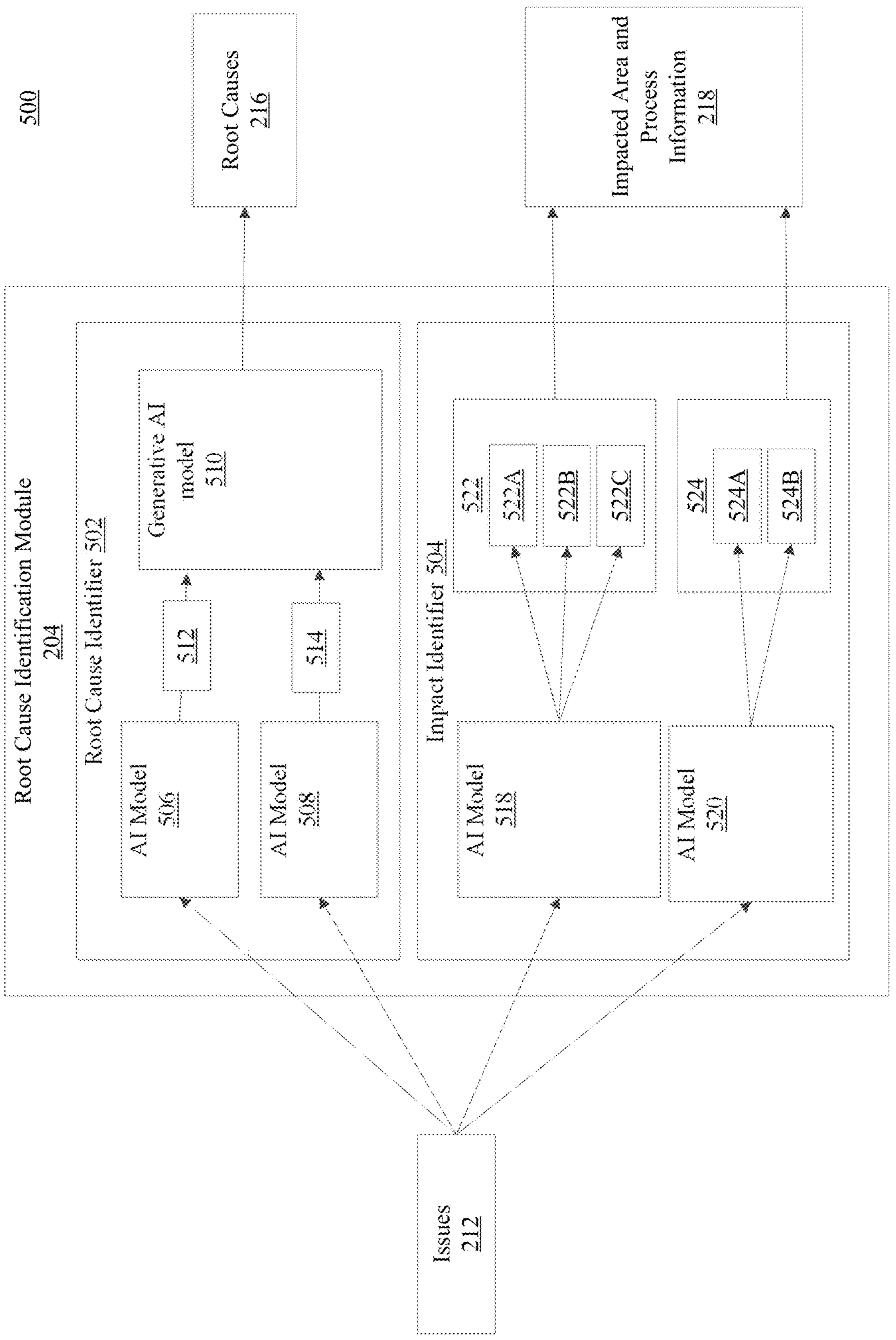
FIG. 5 is a block diagram of a root cause identification module, according to some embodiments.

Going back to FIG. 2, root cause identification module 204 may receive issues 212 and determine root causes 216 of the issues and an impacted area and process information 218 associated with the issues. The impacted area and process information may include impacted systems, organizations, entities, applications, processes, or functions in system 100 in some embodiments. FIG. 5 is a block diagram 500 of root cause identification module 204, according to some embodiments. Root cause identification module 204 may include a root cause identifier 502 and impact identifier 504.

Root cause identifier 502 may include an ensemble of AI models. In a non-limiting embodiment in FIG. 5, an ensemble of AI models may include AI models 506-510, though the embodiments are not limited to three models 506-510. AI models 506-510 may be generative AI models, LLMs, such as GPT-4 or its variants, and may execute in sequence or in parallel. AI models 506 and 508 may receive issues 212. For each issue in issues 212, AI model 506 may identify similar historical issues 512 to issues 212. For each issue in issues 212, AI model 508 may extract a root cause information 514 associated with the issue in issues 212. AI model 510 may receive the similar historical issues 512 and root cause information 514 associated with each issue in issues 212 and predict the root cause 216 for each issue.

The ensemble of AI models may be trained on a training dataset. The AI models in the ensemble may be trained or finetuned together or separately using the training mechanism discussed above. For example, AI model 506 may be trained on training data that includes issues 212 and labels that correspond to similar historical issues 512. The training may occur iteratively until AI model 506 learns to identify similar historical issues 512 within a predefined margin of error from issues 212. In another example, AI model 506 may be trained on data that includes issues 212 and labels for the root cause information 514. The training may occur iteratively until AI model 506 learns to identify the root cause information 514 within a predefined margin of error from issues 212. In yet another example, AI model 510 may be trained on training data that includes issues 212 and root cause information 514 and labels that correspond to root causes 216. Training may occur iteratively until AI model 510 learns to identify the root causes 216 from the issues 212 and root cause information 514 within a predefined margin of error.

Impact identifier 504 may include AI models 518-520. AI models 518-520 may be generative AI models, LLMs, such as GPT-4 or its variants. AI models 518-520 may receive issues 212. For each issue in issues 212, AI model 518 may extract an impacted area information 522 in system 100. In a non-limiting embodiment, example impacted area information 522 may include entities such as impacted systems 522A, impacted products 522B, impacted organizations 522C, and the like. For each issue in issues 212, AI model 520 may extract an impacted processes 524 in system 100. In a non-limiting embodiment, example impacted processes 524 may be impacted processes 524A, impacted functions 524B, or similar. Impact identifier 504 may output a combined impacted area information 522 and impacted process information 524 as impacted area and process information 218.

AI models 518-520 may be trained on training data. The training may be in sequence or in parallel. For example, AI model 518 may be trained on training data that includes issues 212 and labels that correspond to impacted area information 522. The training may occur iteratively until AI model 518 learns to identify impacted area information 522 within a predefined margin of error from issues 212. In another example, AI model 520 may be trained on data that includes issues 212 and labels for the impacted processes 524. The training may occur iteratively until AI model 520 learns to identify the impacted processes 524 within a predefined margin of error from issues 212.

In some embodiments, AI model 510 may further finetune the root causes 216 and impacted area and process information. For example, AI model 510 may generate root cause labels from the plurality of root causes 216 and the impacted area information and the process information 218. From the root cause labels, AI model 510 may generate root cause embeddings. Next, the AI model 510 may use a similarity function, such as a cosine similarity function and the root cause embeddings, to group the root cause labels into groups. Each group in the groups may include a subset of the root cause labels. The subsets of the root cause labels are refined to identify one or more root cause labels from each group. An AI model may receive a subset of root cause labels grouped by the embedding similarity and output a refined label. For example, an AI model may receive a group of root cause labels such as "['data retention', 'data accuracy/completeness', 'data discrepancy', 'data gap/inconsistency', 'data inconsistency', 'data integrity issue', 'data processing issue', 'data quality issue', 'data quality/human error', 'data unavailability', 'data validation issue', 'data staleness', 'content deviation/data storage weakness', 'data issue', 'data encryption issue']" and generate a refined label that is "Data Management Concerns." Similarly, the AI model may receive an above group of root causes and a refined labeled as an example to generate other refined labels for another group of root causes.

The root cause summary, which may be root cause 216, may be generated from the identified one or more root cause labels.

In some embodiments, root cause detection system 120 may display the issues 212, root causes 216 and impacted area and process information 218 using root cause detection system interface 122. In some instances root cause detection system 120 may generate a network graph that represents the relationships between root causes, impacted area and process information, and issues 212.

Figure 6A:
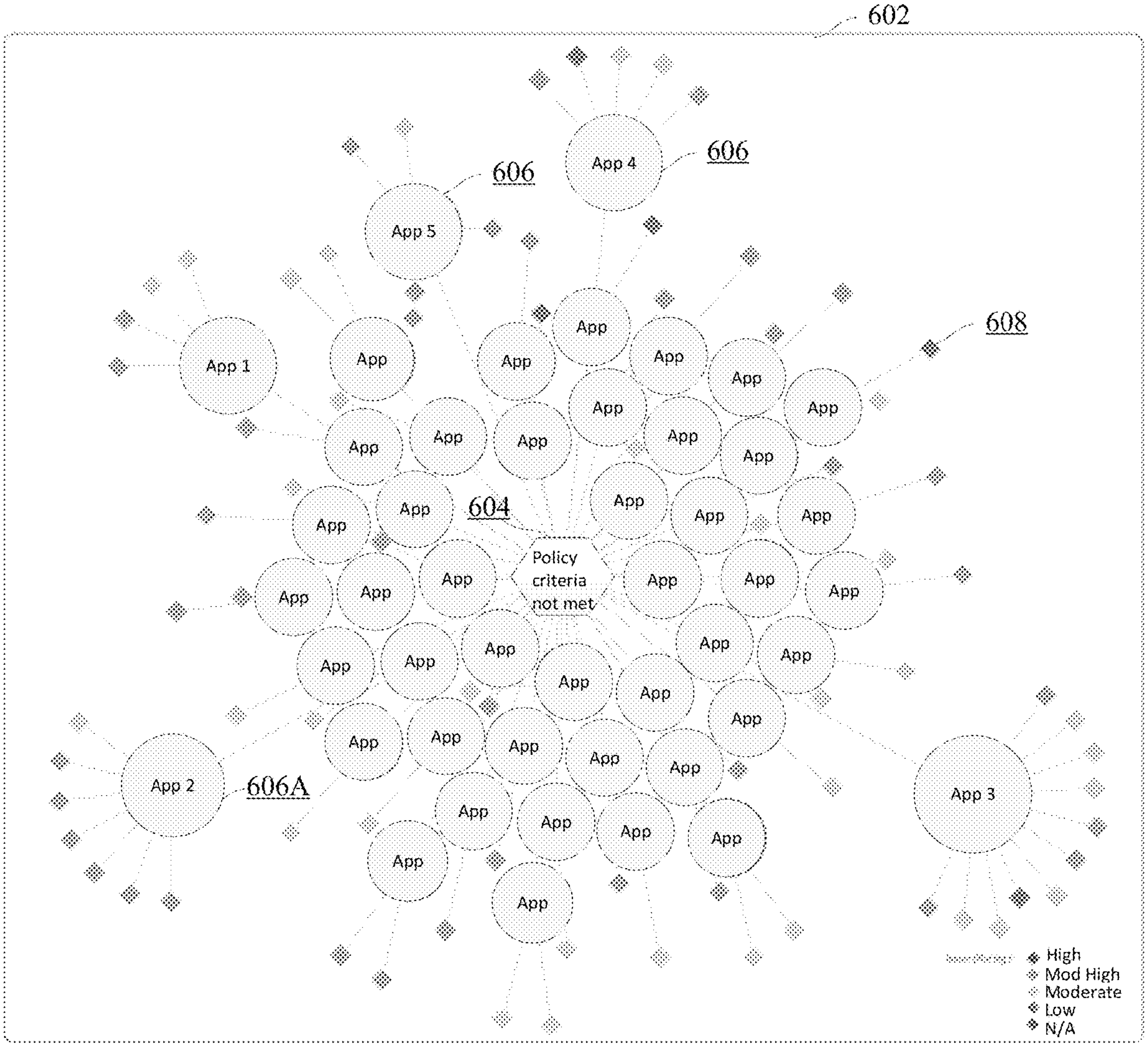
FIGS. 6A-6C are diagrams of a root cause detection system interface depicting a network graph, according to some embodiments.
Figure 6B:
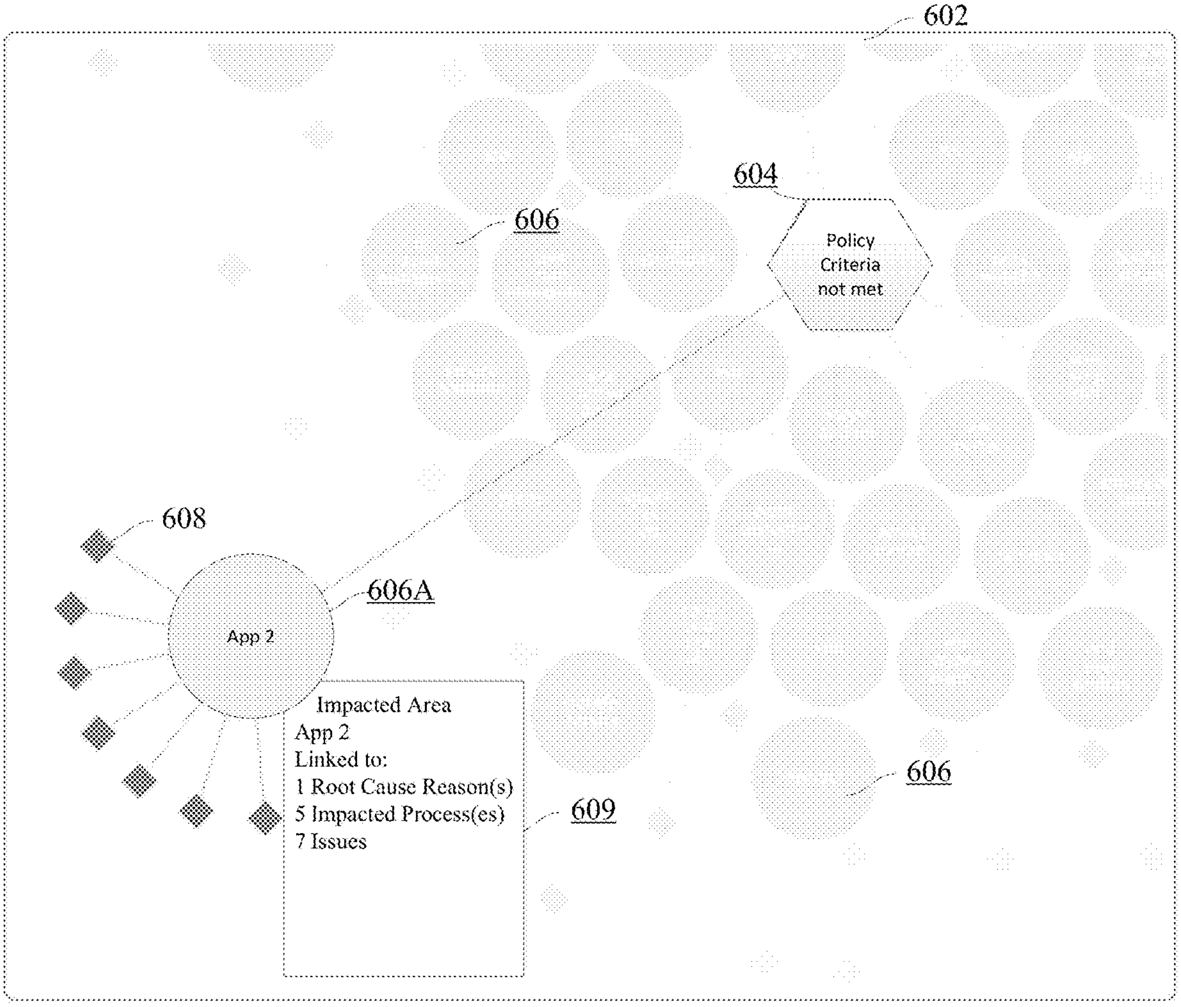
Figure 6C:
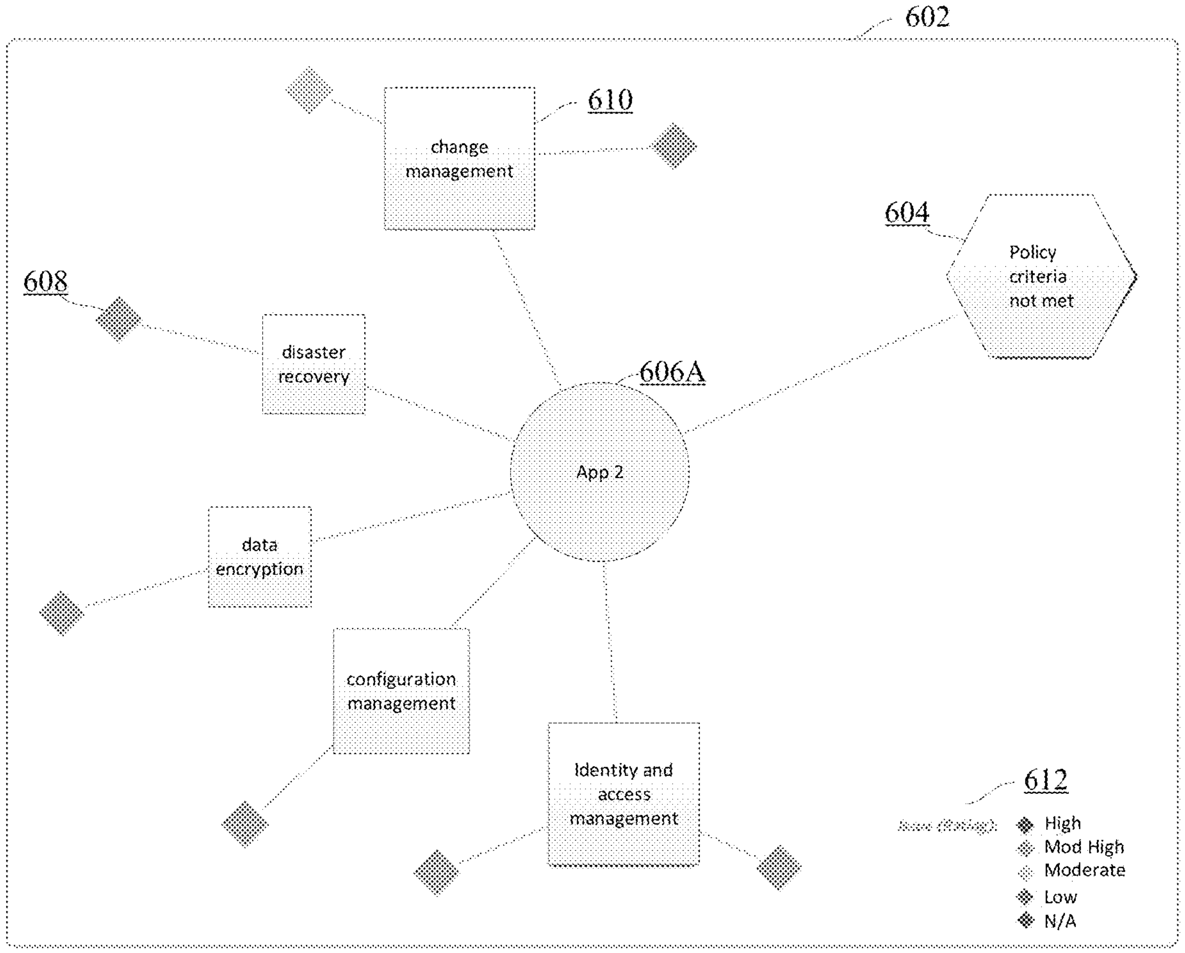

FIGS. 6A-C are diagrams 600A-C of root cause detection system interface 122 displaying example issues 212, root cause 216 and impacted area and process information 218, according to some embodiments. FIG. 6A illustrates root cause detection system interface 122 that displays a network graph 602, according to some embodiments. Network graph 602 may be a traversable graph that may be traversed to identify root causes 604, impacted areas from impacted area and process information 218, shown as entities 606, and issues 212 shown as issues 608. Network graph 602 may illustrate root causes 604, issues 608, and entities 606 using different geometric shapes. For example, network graph 602 illustrates root cause 604 as a hexagonal shape, issues 608 as squares, and entities 606 as circles. An example root cause 604 in FIG. 6A is a "policy criteria not met." From root cause 604 there may be multiple connections corresponding to entities 606 that may be associated with root cause 604. Although shown in FIG. 6A as applications ("App"), entities 606 may be applications, entities, organizations, or products.

Entities 606 may connect to one or more issues 608. The connections indicate that an entity in entities 606 may be experiencing one or more issues 608. The size of the circle that is associated with each entity in entities 606 may correspond to a number of issues 608 that are associated with the corresponding entity. As discussed above, issues 608 may be represented by squares. The color of the squares may correspond to a severity or rating of issues 608.

Root cause detection system interface 122 may receive input that may cause root cause detection system interface 122 to traverse network graph 602. For example, root cause detection system interface 122 may receive input, e.g., via one of input devices discussed in FIG. 10 that selects one of entities 606, such as entity 606A associated with root cause 604. FIG. 6B illustrates entity 606A that is associated with root cause 604 and seven issues 608, according to some embodiments. In FIG. 6B, the input selecting entity 606A may cause the rest of entities 606 to be grayed out, thus highlighting entity 606A. Further, once root cause detection system interface 122 receives the input, root cause detection system interface 122 may automatically display information associated with entity 606A, such as issues 608. Root cause detection system interface 122 may also show a legend 609 that describes an impacted area, which is one root cause 604, five impacted processes, and seven issues 608.

Root cause detection system interface 122 may receive input that may cause root cause detection system interface 122 to further analyze entity 606A. FIG. 6C illustrates entity 606A with different processes and/or functions 610 that are associated with the issues 608 in entity 606A. The processes and/or functions 610 that are associated with issues 608 may be included in impacted area and process information 218. Root cause detection system interface 122 may represent processes and/or functions 610 using square shapes, in some embodiments. Also, the size of the squares may correspond to a number of issues 608 that are associated with the processes and/or functions 610.

In some instances, root cause detection system interface 122 may also display a legend 612 indicating the severity of issues 608. In this way, root cause detection system interface 122 provides an intuitive interface that identifies issues 608 across different areas and functions 610 and allows to easily identify recurring issues 608.

Figure 7:
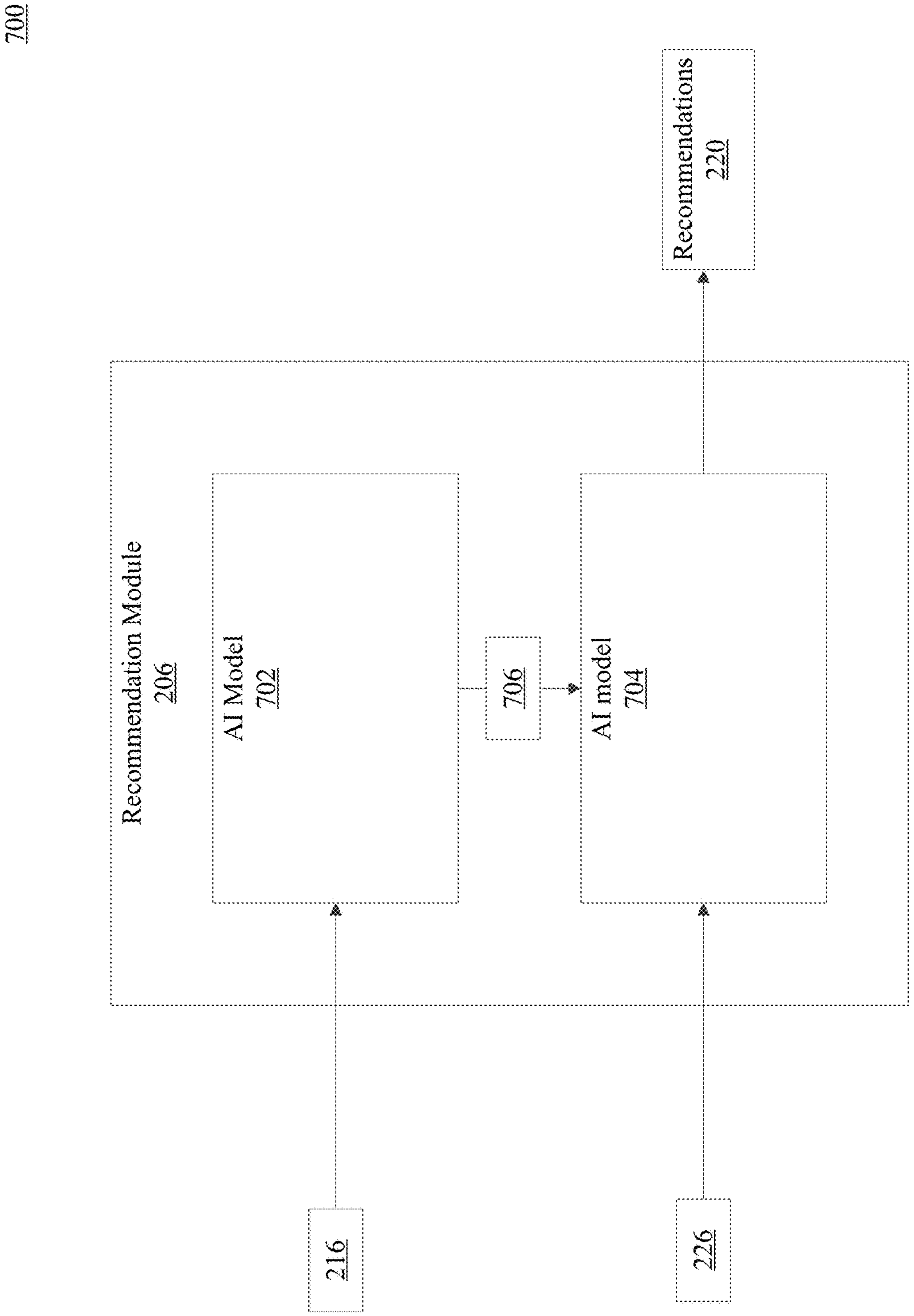
FIG. 7 is a block diagram of a recommendation module, according to some embodiments.

Going back to FIG. 2, root cause identification module 204 may include recommendation module 206. Recommendation module 206 may generate recommendations 220 for remedying or reducing instances of issues 212. FIG. 7 is a block diagram 700 of recommendation module 206, according to some embodiments. Recommendation module 206 may include AI model 702 and AI model 704, according to some embodiments. AI models 702-704 may be generative AI models, LLMs, such as GPT-4 or its variants, or the like. AI model 702 may receive root cause 216. Using root cause 216, AI model 702 may identify similar historical issues that correspond to historical root causes 706 that are similar to root cause 216. To identify historical root causes 706, AI model 702 may be trained and/or finetuned on a training dataset that includes historical issues and corresponding historical root causes, as discussed above.

AI model 704 may receive impacted area and process information 218 and historical root causes 706. Using impacted area and process information 218 and historical root causes 706, AI model 704 may generate recommendations 220 for remedying issues 212. To generate recommendations 220, AI model 702 may be trained and/or finetuned on a training dataset that includes historical impacted area and process information 218 and historical root causes 706, and labels corresponding to historical recommendations. The training may be as discussed above.

FIG. 8 is a diagram 800 that illustrates example recommendations 220 that AI model 704 generates and that may be displayed using root cause detection system interface 122. In some embodiments, a predefined number of recommendations, such as top N recommendations, where Nis an integer may be displayed.

Figure 9:
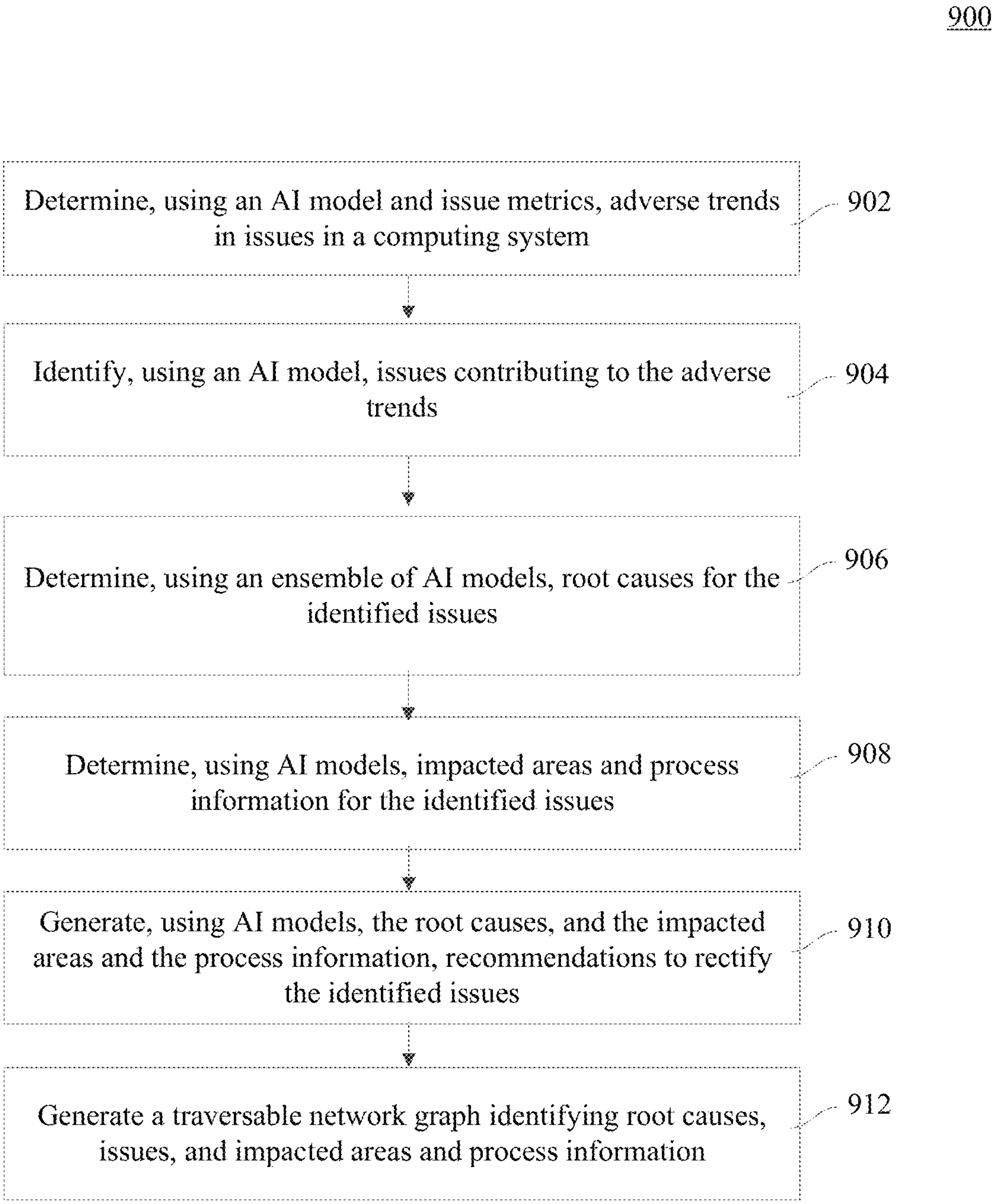
FIG. 9 is a flowchart of a method for automatically detecting root causes in a computing system, according to an embodiment.

FIG. 9 is a flowchart of a method 900 for detection root causes in a computing system, according to an embodiment. Method 900 may be performed using hardware and/or software components described in FIGS. 1-8. Note that one or more of the operations may be deleted, combined, or performed in a different order as appropriate.

At operation 902, adverse trends are determined. For example, root cause detection system 120 may receive issue metrics 208 that may include one or more metrics associated with issues in system 100. Trend analytics module 202 may include an AI model that detects adverse trends 210 from the issue metrics 208. Trend analytics module 202 may also generate narrative summary 214 that summarizing the adverse trends 210.

At operation 904, issues corresponding to adverse trends are identified. For example, trend analytics module 202 may identify issues 212 that contribute to adverse trends 210, such as an increase in outstanding issue volume or an increase in the number of past due issues reported.

At operation 906, root causes for the issues are determined. For example, root cause identification module 204 may receive issues 212 and use an ensemble of AI models 506-510 to generate one or more root causes 216 for the each issue in issues 212. As discussed above, AI model 506 may receive issues 212 and identify similar historical issues 512 to issues 212. Next, AI model 508 may receive issues 212 and for each issue in issues 212 extract root cause information 514 associated with each issue in issues 212. From the similar historical issues 512 and root cause information 514, AI model 510 may determine root causes 216 for issues 212.

At operation 908, impacted area and process information are determined identified. For example, root cause identification module 204 may receive issues 212 and use AI model 518 to identify impacted area information 522 in system 100. Example impacted areas may be impacted systems 522A, impacted products 522B, or impacted organizations 522C. AI model 520 may receive issues 212 and identify impacted processes 524, such as processes 224A and/or functions 224B. As discussed above, the impacted area information 522 and impacted processes 524 may be referred to as impacted area and process information 218.

At operation 910, recommendations are generated. For example, recommendation module 206 may receive root causes 216 and impacted area and process information 218 for issues 212. AI model 702 may use root causes 216 to generate similar root causes 706 that are similar to root cause 216. AI model 704 may receive impacted area and process information 218 and similar root causes 706 to generate recommendations 220. Recommendations may be displayed using root detection system interface 122.

At operation 912, a network graph is generated. For example, root cause detection system interface 122 may generate network graph 602. Network graph 602 may be a traversable graph that may connect root causes 604, impacted entities 606, issues 608, and processes and functions 610 that were impacted by the issues 608.

Figure 10:
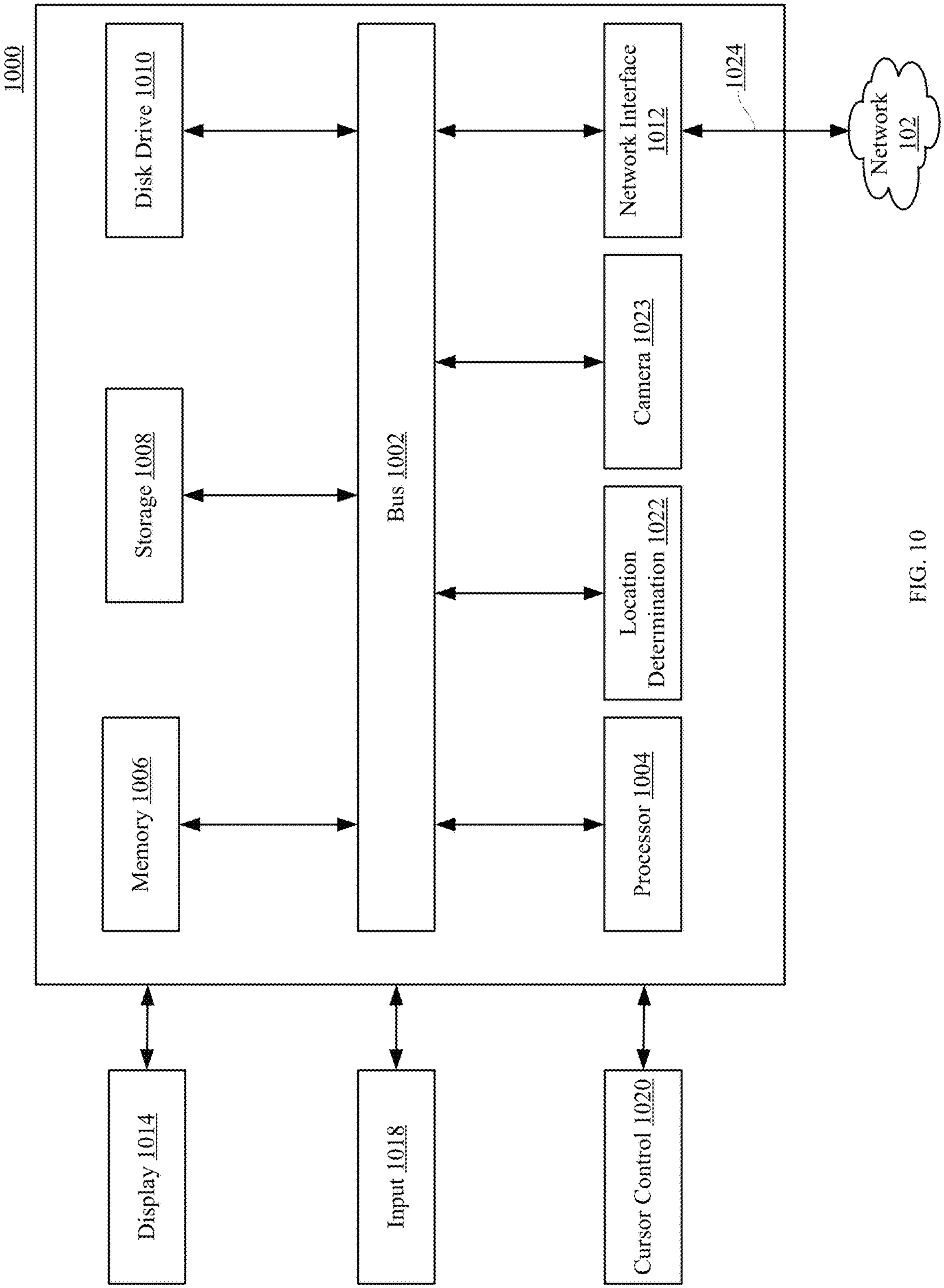
FIG. 10 is a block diagram of a computer system suitable for implementing one or more components or operations in FIGS. 1-9 according to an embodiment.

Referring now to FIG. 10 an embodiment of a computer system 1000 suitable for implementing, the systems and methods described in FIGS. 1-9 is illustrated.

In accordance with various embodiments of the disclosure, computer system 1000, such as a computer and/or a server, includes a bus 1002 or other communication mechanism for communicating information, which interconnects subsystems and components, such as a processing component 1004 (e.g., processor, micro-controller, digital signal processor (DSP), graphics processing unit (GPU), etc.), a system memory component 1006 (e.g., RAM), a static storage component 1008 (e.g., ROM), a disk drive component 1010 (e.g., magnetic or optical), a network interface component 1012 (e.g., modem or Ethernet card), a display component 1014 (e.g., CRT or LCD), an input component 1018 (e.g., keyboard, keypad, or virtual keyboard), a cursor control component 1020 (e.g., mouse, pointer, or trackball), a location determination component 1022 (e.g., a Global Positioning System (GPS) device as illustrated, a cell tower triangulation device, and/or a variety of other location determination devices known in the art), and/or a camera component 1023. In one implementation, the disk drive component 1010 may comprise a database having one or more disk drive components.

In accordance with embodiments of the disclosure, the computer system 1000 performs specific operations by the processor 1004 executing one or more sequences of instructions contained in the memory component 1006, such as described herein with respect to the mobile communications devices, mobile devices, and/or servers. Such instructions may be read into the system memory component 1006 from another computer readable medium, such as the static storage component 1008 or the disk drive component 1010. In other embodiments, hard-wired circuitry may be used in place of or in combination with software instructions to implement the disclosure.

Logic may be encoded in a computer readable medium, which may refer to any medium that participates in providing instructions to the processor 1004 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1010, volatile media includes dynamic memory, such as the system memory component 1006, and transmission media includes coaxial cables, copper wire, and fiber optics, including wires that comprise the bus 1002. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 1000. In various other embodiments of the disclosure, a plurality of the computer systems 1000 coupled by a communication link 1024 to the network 102 (e.g., such as a LAN, WLAN, PTSN, and/or various other wired or wireless networks, including telecommunications, mobile, and cellular phone networks) may perform instruction sequences to practice the disclosure in coordination with one another.

The computer system 1000 may transmit and receive messages, data, information and instructions, including one or more programs (i.e., application code) through the communication link 1024 and the network interface component 1012. The network interface component 1012 may include an antenna, either separate or integrated, to enable transmission and reception via the communication link 1024. Received program code may be executed by processor 1004 as received and/or stored in disk drive component 1010 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A method comprising:

determining, using at least one artificial intelligence (AI) model, adverse trends from at least one issue metric, wherein the at least one issue metric is associated with issues occurring in a computing system;

identifying a plurality of issues corresponding to the adverse trends in the computing system;

determining, using an ensemble of AI models, a plurality of root causes from the plurality of issues, wherein the determining further comprises:

generating, using a first AI model in the ensemble of AI models, similar historical issues from the plurality of issues;

generating, using a second AI model in the ensemble of AI models and in parallel with the first AI model, root cause information from the plurality of issues; and generating, using a third AI model in the ensemble of AI models, the plurality of root causes for the plurality of issues from the similar historical issues and the root cause information;

determining, using the at least one AI model, impacted area information and process information from the plurality of issues;

determining, using the at least one AI model, at least one recommendation for rectifying the plurality of issues from the plurality of root causes, the impacted area information and the process information; and generating a traversable network graph comprising the plurality of root causes, the impacted area information, the process information, and the plurality of issues.

2. The method of claim 1, further comprising:

generating, using the at least one AI model, a narrative summary summarizing at least one adverse trend in the adverse trends; and displaying the narrative summary on a user interface.

3. The method of claim 1, further comprising:

generating, using the at least one AI model, root cause labels from the plurality of root causes, the impacted area information and the process information;

generating root cause embeddings from the root cause labels;

grouping, using a similarity function, the root cause labels into a plurality of groups, wherein each group in the plurality of groups includes a subset of the root cause labels;

refining subsets of the root cause labels in the plurality of groups, wherein the refining identifies at least one root cause in the each group; and generating a root cause summary for the at least one root cause in the each group.

4. The method of claim 1, wherein determining the impacted area information and the process information from the plurality of issues further comprises:

generating, using a fourth AI model in the at least one AI model, the impacted area information; and generating, using a fifth AI model in the at least one AI model, the process information.

5. The method of claim 1, wherein determining the at least one recommendation further comprises:

generating, using the first AI model in the at least one AI model and the plurality of root causes, historical issues associated with historical root causes; and generating the at least one recommendation using a fourth AI model in the at least one AI model, the historical issues, the impacted area information and the process information.

6. The method of claim 1, wherein the traversable network graph further comprises a plurality of entities associated with the plurality of root causes, the plurality of entities connecting the plurality of root causes to the impacted area information or the process information.

7. The method of claim 6, wherein a size of a geometric figure representing an entity in the plurality of entities corresponds to a number of issues in the plurality of issues associated with the entity.

8. The method of claim 6, further comprising:

displaying the traversable network graph on a user interface;

receiving an input selecting an entity in the plurality of entities corresponding to a root cause in the plurality of root causes displayed in the traversable network graph; and in response to the input, displaying geometric shapes in the traversable network graph that correspond to the entity, a subset of issues of the plurality of issues corresponding to the entity, and the root cause.

9. The method of claim 8, further comprising:

receiving a second input expanding the selected entity; and in response to the second input, displaying, in the traversable network graph, a subset of impacted areas and process information that correspond to the entity, and the subset of issues that correspond to the subset of impacted areas and process information.

10. A system comprising:

a non-transitory memory storing instructions; and one or more hardware processors coupled to the non-transitory memory and configured to read the instructions from the non-transitory memory to cause the system to perform operations comprising:

determining, using a first generative artificial intelligence (AI) model, adverse trends from at least one issue metric;

identifying a plurality of issues corresponding to the adverse trends in a computing environment;

determining, using a first AI model in an ensemble of generative AI models, a plurality of root causes from the plurality of issues;

determining, using a second AI model in the ensemble of generative AI models, impacted area information and process information from the plurality of issues;

determining, using a third generative AI model in the ensemble of generative AI models, the plurality of root causes, the impacted area information and the process information, at least one recommendation for rectifying the plurality of issues;

generating a traversable network graph comprising the plurality of root causes, the impacted area information, the process information, and the plurality of issues, wherein the impacted area information comprises impacted systems and products, and process information comprises impacted processes or functions; and displaying the traversable network graph on a user interface.

11. The system of claim 10, further comprising:

generating, using a fourth generative AI model, narrative summaries summarizing a predefined number of the adverse trends; and displaying the narrative summaries on the user interface.

12. The system of claim 10, further comprising:

generating, using at least one AI model, root cause labels from the plurality of root causes, the impacted area information and the process information;

generating root cause embeddings from the root cause labels;

grouping, using a similarity function, the root cause labels into a plurality of groups, wherein each group in the plurality of groups includes a subset of the root cause labels;

refining subsets of the root cause labels in the plurality of groups, wherein the refining identifies at least one root cause in the each group; and generating a root cause summary for the at least one root cause in the each group.

13. The system of claim 10, wherein determining the impacted area information and the process information from the plurality of issues further comprises:

generating, using the second AI model, the impacted area information and the process information.

14. The system of claim 10, wherein determining the at least one recommendation further comprises:

generating, using the third generative AI model and the plurality of root causes, historical issues associated with historical root causes; and generating, using the third generative AI model, the historical issues, the impacted area information and the process information, the at least one recommendation.

15. The system of claim 10, wherein the traversable network graph further comprises a plurality of entities associated with the plurality of root causes, the plurality of entities connecting the plurality of root causes to the impacted area information and the process information, and wherein a size of a geometric figure representing an entity in the entities corresponds to a number of issues in the plurality of issues associated with the entity.

16. A non-transitory machine-readable medium having stored thereon machine-readable instructions executable to cause a machine to perform operations comprising:

determining, using a plurality of large language models (LLMs), adverse trends from at least one issue metric, wherein the at least one issue metric is associated with issues occurring in a computing system;

identifying a plurality of issues corresponding to the adverse trends in the computing system;

determining, using the plurality of LLMs, a plurality of root causes from the plurality of issues, wherein the determining further comprises:

generating, using a first LLM in the plurality of LLMs, similar historical issues from the plurality of issues;

generating, using a second LLM in the plurality of LLMs and in parallel with the first LLM, root cause information from the plurality of issues; and generating, using a third LLM in the plurality of LLMs, the plurality of root causes for the plurality of issues from the similar historical issues and the root cause information;

determining, using the plurality of LLMs, impacted area information from the plurality of issues in parallel with determining process information from the plurality of issues;

determining, using the plurality of LLMs, at least one recommendation for rectifying the plurality of issues from the plurality of root causes and the impacted area information and the process information; and generating a traversable network graph comprising the plurality of root causes, the impacted area information and the process information, and the plurality of issues.

17. The non-transitory machine-readable medium of claim 16, wherein the traversable network graph further comprises a plurality of entities associated with the plurality of root causes, the plurality of entities connecting the plurality of root causes to the impacted area information or the process information.

18. The non-transitory machine-readable medium of claim 16, wherein the impacted area information comprises impacted systems and products, and process information comprises impacted processes or functions.

19. The non-transitory machine-readable medium of claim 16, further comprising:

receiving a selection of a node in the traversable network graph corresponding to an impacted area information; and automatically displaying nodes in the traversable network graph corresponding to at least one issue and at least one root cause associated with the selected node.

20. The method of claim 1, wherein the impacted area information comprises impacted systems and products, and process information comprises impacted processes or functions.

* * * * *